US008892479B2

(12) United States Patent
Tan et al.

(10) Patent No.: US 8,892,479 B2
(45) Date of Patent: *Nov. 18, 2014

(54) RECOGNIZING FINGER GESTURES FROM FOREARM EMG SIGNALS

(71) Applicant: Microsoft Corporation, Redmond, WA (US)

(72) Inventors: Desney Tan, Kirkland, WA (US); Dan Morris, Bellevue, WA (US); T. Scott Saponas, Seattle, WA (US); Ravin Balakrishnan, Toronto (CA)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,060

(22) Filed: Apr. 20, 2013

(65) Prior Publication Data
US 2013/0232095 A1 Sep. 5, 2013

Related U.S. Application Data

(63) Continuation of application No. 12/146,471, filed on Jun. 26, 2008, now Pat. No. 8,447,704.

(51) Int. Cl.
*G06N 99/00* (2010.01)
*G06F 3/01* (2006.01)

(52) U.S. Cl.
CPC .............. *G06N 99/005* (2013.01); *G06F 3/017* (2013.01); *G06F 3/015* (2013.01)
USPC ............................................ 706/12; 706/62

(58) Field of Classification Search
CPC ........ G06N 99/005; G06F 3/015; G06F 3/017
USPC .................................................... 706/12, 62
See application file for complete search history.

(56) References Cited

U.S. PATENT DOCUMENTS

2008/0294019 A1* 11/2008 Tran .............................. 600/301

OTHER PUBLICATIONS

Chen et al ("Hand Gesture Recognition Research Based on Surface EMG Sensors and 2D-accelerometers" Oct 2007 IEEE).*
Makino et al ("Comfortable Wristband Interface Measuring Myoelectric Pattern" WHC'07).*
Peter et al ("A Wearable Multi-sensor System for Mobile Acquisition of Emotion-Related Physiological Data" 2005.*
Naik et al ("Subtle Hand gesture identification for HCI using Temporal Decorrelation Source Separation BSS of surface EMG" 2007).*
Amft et al ("Sensing Muscle Activities with Body-Worn Sensors" 2006).*

* cited by examiner

*Primary Examiner* — Lut Wong
(74) *Attorney, Agent, or Firm* — Cassandra T. Swain; Judy Yee; Micky Minhas

(57) ABSTRACT

A machine learning model is trained by instructing a user to perform various predefined gestures, sampling signals from EMG sensors arranged arbitrarily on the user's forearm with respect to locations of muscles in the forearm, extracting feature samples from the sampled signals, labeling the feature samples according to the corresponding gestures instructed to be performed, and training the machine learning model with the labeled feature samples. Subsequently, gestures may be recognized using the trained machine learning model by sampling signals from the EMG sensors, extracting from the signals unlabeled feature samples of a same type as those extracted during the training, passing the unlabeled feature samples to the machine learning model, and outputting from the machine learning model indicia of a gesture classified by the machine learning model.

20 Claims, 5 Drawing Sheets

RECOGNIZING FINGER GESTURES FROM FOREARM EMG SIGNALS

CROSS-REFERENCE TO RELATED APPLICATIONS

This application is a Continuation Application of U.S. patent application Ser. No. 12/146,471, now U.S. Pat. No. 8,447,704, filed on Jun. 26, 2008, by Tan, et al., and entitled "RECOGNIZING GESTURES FROM FOREARM EMG SIGNALS," and claims the benefit of that prior application under Title 35, U.S. Code, Section 120.

BACKGROUND

Human-computer interactions have been primarily detected using direct manipulation of devices such as mice, keyboards, pens, dials, and touch-sensitive surfaces. As computing and digital information becomes integrated into everyday environments, situations arise where it may be inconvenient or difficult to use hands to directly manipulate an input device. For example, a driver attempting to query a vehicle navigation system might find it helpful to be able to do so without removing his or her hands from the steering wheel. A person in a meeting may wish to unobtrusively interact with a computing device. Furthermore, direct physical manipulation spreads microbes, so hands-free input mechanisms can helpful in areas sensitive to contamination, for example surgery rooms.

Most implement-free or hands-free interaction approaches have involved speech and computer vision. While improving, these technologies still have drawbacks. They can be unreliable, sensitive to interference from environmental noise, and can require a person to make obtrusive motions or sounds.

Another approach is to infer user input from sensed human muscle activity. Advances in muscular sensing and processing technologies make it possible for humans to interface with computers directly with muscle activity. One sensing technology, electromyography (EMG), measures electrical potentials generated by the activity of muscle cells. EMG-based systems may use sensors that are carefully placed according to detailed knowledge of the human physiology. Specific muscle activity is measured and used to infer movements, intended or not. While this has been done with meticulously placed EMG sensors under artificial test conditions and finely tuned signal processing, to date, gestures have not been decoded from forearm EMG signals in a way that would allow everyday use.

Techniques described below relate to robust recognition of rich sets of gestures from forearm EMG signals in ways that may allow EMG sensors to be arbitrarily placed or worn.

SUMMARY

The following summary is included only to introduce some concepts discussed in the Detailed Description below. This summary is not comprehensive and is not intended to delineate the scope of the claimed subject matter, which is set forth by the claims presented at the end.

A machine learning model is trained by instructing a user to perform various predefined gestures, sampling signals from EMG sensors arranged arbitrarily on the user's forearm with respect to locations of muscles in the forearm, extracting feature samples from the sampled signals, labeling the feature samples according to the corresponding gestures instructed to be performed, and training the machine learning model with the labeled feature samples. Subsequently, gestures may be recognized using the trained machine learning model by sampling signals from the EMG sensors, extracting from the signals unlabeled feature samples of a same type as those extracted during the training, passing the unlabeled feature samples to the machine learning model, and outputting from the machine learning model indicia of a gesture classified by the machine learning model.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Embodiments discussed below relate to providing a muscle-computer interface where muscle activity is translated into gestures. Some background on EMG technology will be provided first. Wearable EMG devices will be described next, followed by description of a general system for using machine learning to recognize gestures from forearm EMG signals. Details of training a model (learning machine) and extracting signal features will also be described.

It should be noted that it is difficult to reliably recognize gestures, in particular finger gestures, in a real-world setting with arbitrarily placed EMG sensors, limited training capabilities, etc. Therefore, specific combinations of parameters, components, and design choices are set forth below because they have been proven through experimentation to provide reliable results. Nonetheless, variations and alternatives are contemplated without explicit mention thereof.

Sensing Muscles with EMG

Human skeletal muscles are made up of muscle fibers attached to bone by tendons. To contract a muscle, the brain sends an electrical signal through the nervous system to motor neurons. Motor neurons in turn transmit electrical impulses to adjoining muscle fibers, causing the muscle fibers to contract. Many motor neurons and their muscle fibers make up a muscle. During muscle contraction, some subset of these neurons and muscle fibers are activated and the sum of their electrical activity during contraction can be measured with electromyography (EMG). An EMG sensor can measure muscular electrical signals from the surface of the skin. While easy to apply, a surface EMG sensor can produce a somewhat noisy signal as the muscular electrical signals must pass though body tissues such as fat and skin before they can be captured at the surface of the skin. Due to the sensitivity of EMG sensors required to detect these signals, they also typically detect other electrical phenomena such as activity from other muscles, skin movement over muscles, and environmental phenomena. Techniques for dealing with these issues will be described later.

Wearable Device with EMG Sensors

Figure 1:
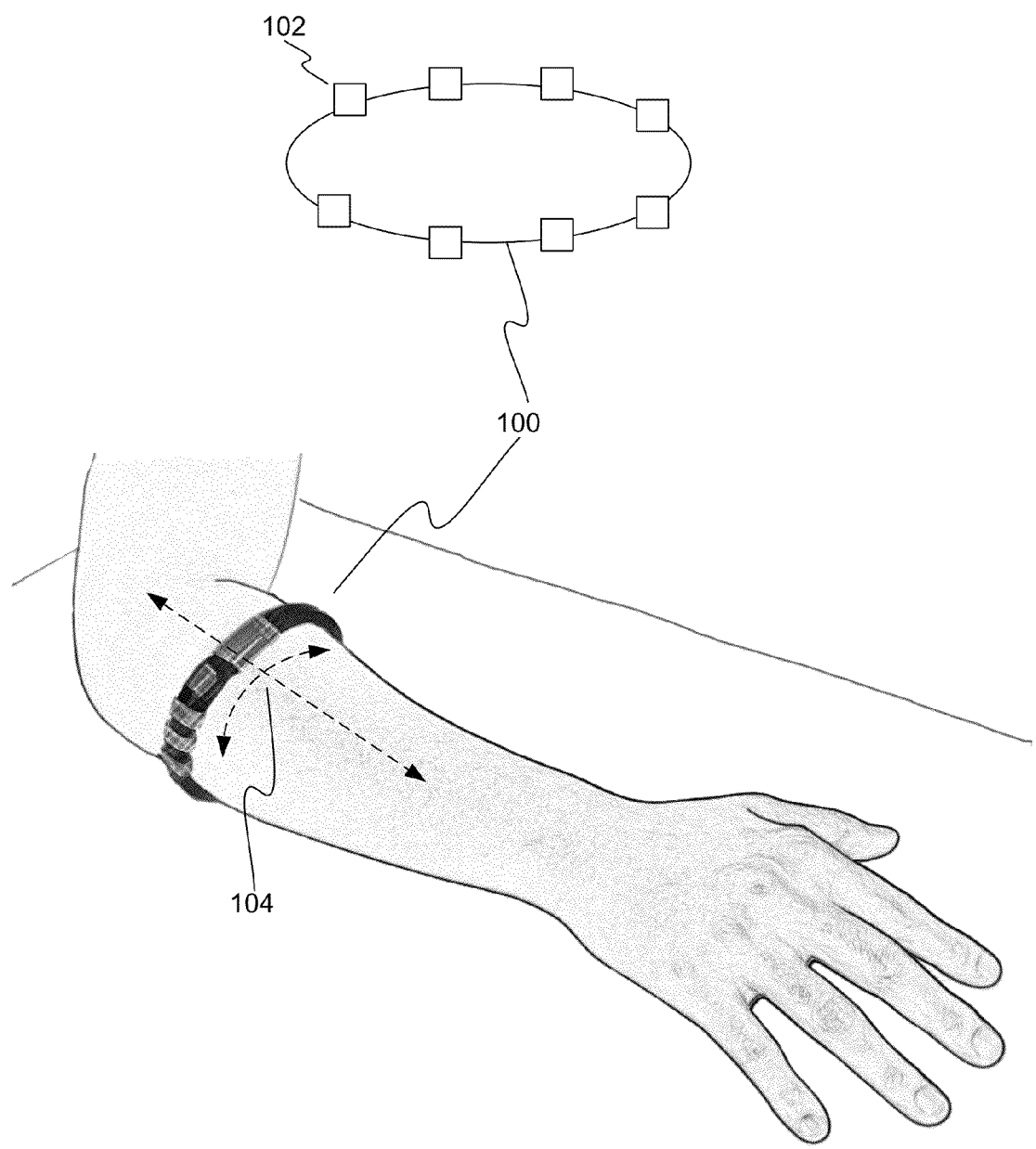
FIG. 1 shows a wearable band with EMG sensors.

FIG. 1 shows a wearable band 100 with EMG sensors 102. The band 100 may be elastic and the EMG sensors contact the skin of the forearm when the band 100 is worn. A wireless interface (not shown) is used to communicate with a computing device that processes the signals generated by the sensors 102. Other means of communication, such as IR or wire may also be used. Though not required, the EMG sensors 102 are preferably uniformly spaced. Techniques described below are designed to permit the band 100 to be somewhat arbitrarily placed on the arm. As indicated by arrows 104, the band can be placed in varying orientation and location on the forearm, preferably the upper forearm. As muscles contract in the forearm, the EMG sensors 102 will detect the corresponding electrical activity and transmit the signals. The band 100 may transmit raw signals or it may have a processor to perform some initial signal processing, for example rectification, noise reduction, filtering, etc. In yet another embodiment, the band 100 may be provided with sufficient processor and storage capacity to perform the computational tasks described below, in which case the band 100 recognizes finger gestures and transmits indicia of same.

Other wearable device configurations may also be used. For example, a wide band may be configured with many (perhaps 50-250) EMG sensors. In this case, signal analysis can be used to select only a specific subset of the sensors for active sensing. Sensors can be selected by detecting their signal strength either separately or relative to other sensors. In one embodiment EMG sensors 102 are arranged linearly around band 100. Other layouts may be used.

It should be noted that the techniques described below can also be used with individual sensors; a wearable device is not necessary. Individual EMG sensors may be placed without regard for precise location of muscle bellies, for example.

Gesture Recognition

Figure 2:
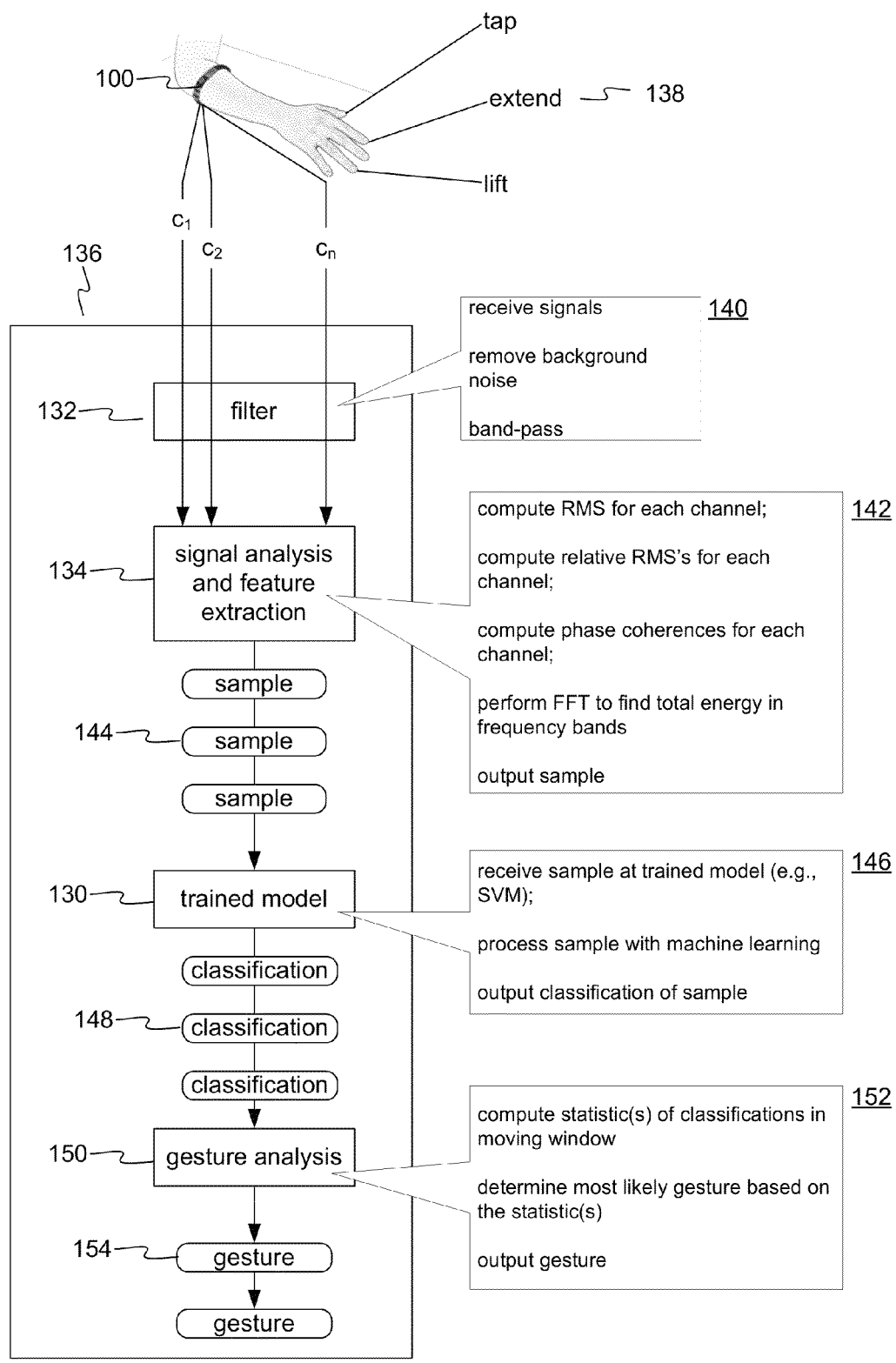
FIG. 2 shows a system for recognizing gestures from forearm EMG signals.

FIG. 2 shows a system for recognizing gestures from forearm EMG signals. The general approach is to sample training gestures, label the samples (i.e., associate gestures with samples), and train a model. The model then receives real-time samples and uses the trained model to identify gestures. As used herein, a gesture refers to a finger movement, which may be an individual finger movement. A gesture may be considered to be a finger movement of any type. A gesture may also be for a specific type of movement, for example, lift, press, bend, etc. A gesture may also be a combination of fingers. Discrete gestures, once recognized, can be used by any of the infinite variety of applications just as applications use other forms of interactive input.

Referring again to FIG. 2, the system shown in FIG. 1 assumes a trained model 130. Training of the model 130 will be described in detail later with reference to FIG. 4. However, it should be noted that aspects of the system in FIG. 2 may play a role in training. For example, filter 132, signal analysis and feature extraction module 134, and/or other parts of the system may be used to prepare training data.

In one embodiment, the system in FIG. 2 may be realized with a computing device 136. For example, a workstation may serve as the computing device 136. Various components common in signal processing may also be included and are not discussed herein. For example, the computing device 136 may have an analog to digital converter, a digital signal processor, or other signal processing hardware.

Turning now to the operation of the system in FIG. 2, a wearable device or band 100 is on a forearm as fingers make various physical gestures 138. Corresponding muscle contractions generate electrical activity that is sensed by the n EMG sensors of band 100, transmitted along channels $c_1 \ldots c_n$, to filter 132. Note that in one embodiment there are 8 individual EMG sensors (n=8). However, other numbers may be used. Fewer sensors may be needed if conductive gel is used. Additional sensors may require more power but may produce more accurate results. In one embodiment, BioSemi Active Two (™) sensors may be used, sampling at 2048 Hz.

The filter 132 performs a process 140 that may include receiving the EMG signals from the EMG sensors, removing background noise, and applying a band-pass filter. The filter 132 may divide the raw EMG signals into segments, for example 250 ms. A band pass filter may be used to filter out signal energy outside a frequency range, for example 2 Hz to 102 Hz. To avoid common background noise near 60 Hz, a band from 55 Hz to 65 Hz may be removed. Other signal cleaning methods may also be used. Also, the signal segmentation may instead be performed by signal analysis module 134.

The signal analysis module 134 receives the filtered EMG signals of the respective EMG sensors and transforms the signal data into time-independent data in the form of feature samples 144 (a feature sample 144 being a vector of signal features). To do so, signal analysis module 134 performs process 142 for signal samples, a signal sample being segments of signal data from the respective EMG channels for a given time span. For example, a signal sample might comprise 8 250 ms segments of a same time span, the 8 segments coming from the 8 respective EMG sensor channels. For a given signal sample, the signal analysis module 134 may compute features of the individual EMG segments, features of the EMG segments as a group, or both. In one embodiment the signal analysis module 134 computes root mean square (RMS) values, phase coherence values, and/or frequency energy values. Other signal properties may also be extracted.

Regarding RMS values, RMS amplitude of an EMG signal segment is indicative of the amplitude of muscle activity close to a corresponding sensor for a corresponding time period. For a signal segment in a signal sample, the signal segment is rectified by taking its absolute value and then the RMS amplitude is computed. This is done for each segment (channel) in the current signal sample. In addition to generating an RMS value for each segment, relative RMS values are also calculated by taking the ratios of the base RMS values between each pair of the segments/channels (for 8 channels, this would result in 28 ratios). These ratios make the feature space more expressive by representing relationships between channels, rather than treating each channel as being completely independent. If 8 sensors/channels are used, 36 RMS features are extracted for a signal sample (8 individual samples and 28 ratios).

Regarding the above-mentioned phase coherence values, a phase coherence value is a measure of the extent to which the EMG channels in a signal sample have a fixed relationship to each other (e.g., firing in similar manner). The coherence values are computed by taking the ratios of the average phase between all segment pairs. If 8 channels are used there will be 28 coherence values.

Regarding measurement of frequency energy, frequency energy is indicative of the firing rate of muscle activity. The energy is reflective of the underlying activity or physical gesture. To derive the frequency energy feature, the fast Fourier transform (FFT) is computed for each segment in the current signal sample, which gives the energy at each frequency for each segment. The energy of all segments is summed into 10 Hz bins. Assuming a base range of 2 Hz to 55 Hz and 65 Hz to 102 HZ, this yields 10 frequency energy features for each signal sample.

If all of the RMS, phase coherence, and frequency energy features are included as one feature sample, and if 8 channels/sensors are used, then there are 74 individual features in a feature sample. Of course the number and type of features can vary, as well as the number of sensors. It should be noted that the types of features extracted can vary beyond those described herein. However, in selecting a type of feature to compute, consider that the more that a given feature varies according to variation in physical gestures, the more beneficial that feature will be in recognizing gestures. Note also that due to the nature of machine learning, signal elements like background noise or other relatively constant signal elements might not need to be filtered because machine learning will naturally reduce the non-discriminatory influence.

When the signal analysis module 134 has analyzed a signal sample and computed features for same, the feature samples 144 (each corresponding to a different signal sample or time slice of signal data) are communicated to a trained model 130. A feature sample 144 may be thought of as vector of features which is suitable for machine learning.

The trained model 130 receives the feature samples 144 and performs a process 146 of applying the feature samples 144 to classify the incoming feature samples. For example, if a physical gesture 138 generated the signal sample that corresponded to a feature sample classified by the model 130, then the model should output a classification indicating a thumb tap. The details of the model 130 are not important. Preferably the trained model 130 is of the machine learning variety.

In general, supervised learning—learning/training with labeled data is preferred. Several supervised machine learning techniques have been tested and it was found that support vector machines (SVMs) performed well for classifying EMG signal data into gestures. SVMs are a set of supervised machine learning methods, which take a set of labeled training data and create a function that can then be used to predict the labels of like-formed unlabelled data. The labeled training data for an SVM typically consist of input vectors of feature values and labels of respective desired outputs. Generally, SVMs map the input vectors to a high-dimensional space and attempt to create a set of maximal separating hyper-planes between the output variables, or classes. In one embodiment, a Sequential Minimal Optimization (SMO) style SVM was used, in particular an implementation in the Weka toolkit (Witten, I. H., & Frank, E.; "Data mining: Practical machine learning tools and techniques"; 2nd Ed.; Morgan Kaufmann: San Francisco).

SMO is a fast method for training SVMs that breaks the typically large quadratic programming problem into a series of smaller problems which are then solved analytically. This optimization minimizes computation time and memory use. The default parameters for Weka's implementation of the SMO algorithm may be used. Specifically, Weka's complexity parameter may be set to 1.0 and the epsilon for round-off error may set at 1.0E-12. A polynomial kernel function with exponent 1 may be used, with a tolerance parameter of 0.001. Additional details related to training data will be discussed with reference to FIG. 4.

Figure 3:
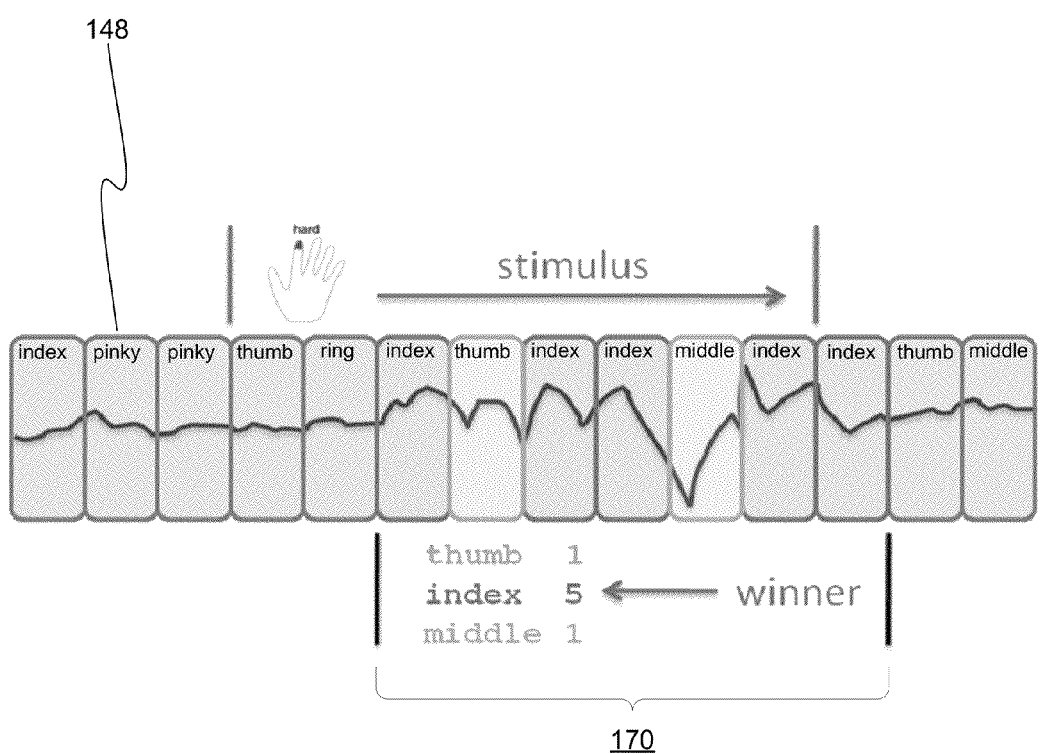
FIG. 3 shows an example sequence of classifications and a window.

Regardless of implementation details, the classifier or trained model 130 outputs predicted classifications of the feature samples. In one embodiment the classifications 148 (e.g., "index finger moved", or "ring finger tapped") can serve as the gesture conclusions output for use by some other application. In another embodiment, the classifications are further processed by a gesture analysis module 150 performing process 152. The gesture analysis module 150 analyzes a moving window of the classifications 148 (e.g., and may apply different strategies to output a gesture. FIG. 3 shows an example sequence of classifications 148 and a window 170. In the window there are 7 classifications 148. In one embodiment, the gesture analysis module uses a vote strategy where the most common classification 148 (in this case "index") is chosen as the output gesture. Other strategies that can be used include picking the classification of the longest unbroken sequence of classifications that are the same. In general, it should be appreciated that individual classifications can be analyzed as a group or aggregation to conclude an intended gesture from multiple classifications that are relatively close to each other in time. In this case, strategies like weighting of classifications, statistical models of classification groups, and others may also be used.

Figure 4:
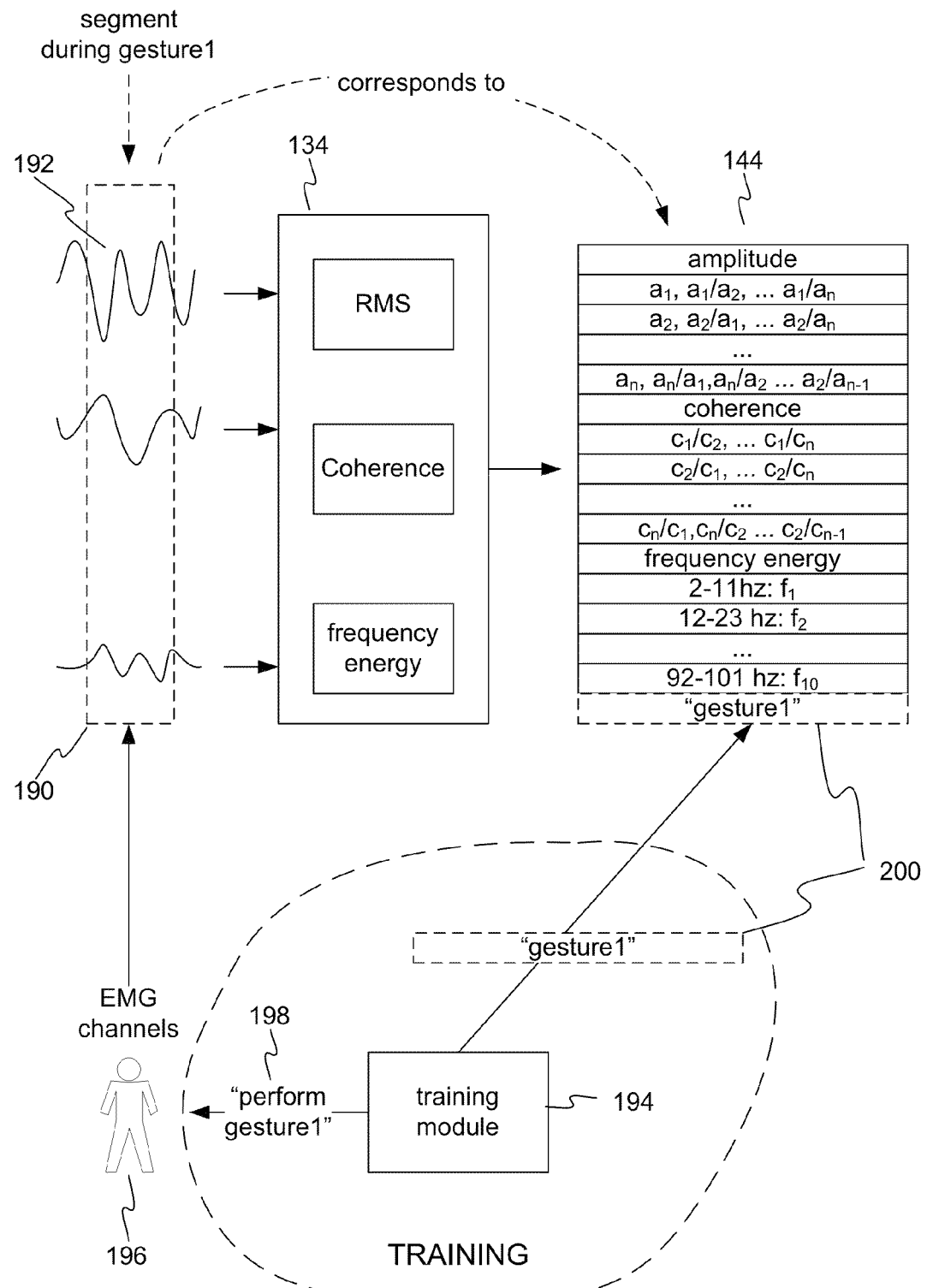
FIG. 4 shows another view of a system for classifying gestures.

FIG. 4 shows another view of a system for classifying gestures. Individual modules of signal analysis module 134 are shown, including an RMS function, a coherence function, and a frequency energy function. As noted above, the signal analysis module 134 receives a signal sample 190, which is a set of signal segments 192 from EMG sensors. The signal analysis module 134 extracts various time-independent features of the signal sample 190 and in turn outputs a corresponding feature vector or feature sample 144. As discussed above, the feature sample 144 may have amplitudes of individual channels (e.g., "$a_1$"), ratios of amplitudes for channel pairs (e.g., "$a_2/a_1$"), coherence ratios for pairs of channels (e.g., "$c_1/c_2$"), and frequency energy broken down over subbands. Additional or other features may be included in feature sample 144.

Figure 5:
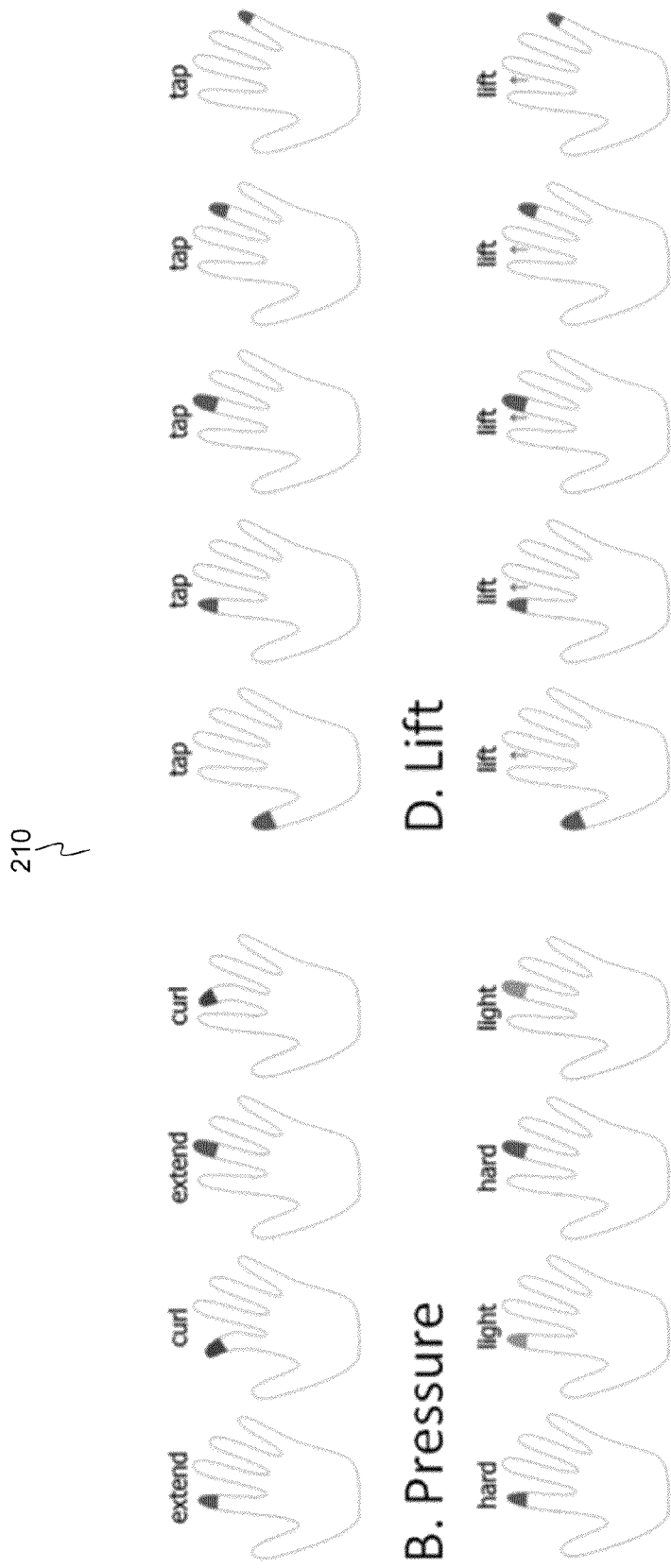
FIG. 5 shows an example training sequence.

FIG. 4 also shows how training can be performed. During a training period, a training module may go through a sequence of pre-determined gestures which the user 196 performs in response to some stimulus, for example a display of the stimulus or an audio clip instructing the user 196 to perform a specific gesture. FIG. 5 shows an example training sequence 210. When training is performed, the training module 194 provides labels 200 to be appended to the feature samples 144. Furthermore, when in training mode, the system puts the machine learning model 130 into training mode. As the labeled feature samples 144 are received by the model 130, the model 130 learns and changes state to reflect the training data. For a given training gesture, a plurality of feature samples 144 will be generated, each labeled with the same gesture. This is can be useful because most finger gestures can be sustained. Therefore, as noted above, to mitigate the variability introduced by individual reaction times, the time period at the beginning of training a particular gesture can be ignored. For example, if a gesture is trained for 2 seconds (e.g., 8 250 ms time slices), then samples for 1 or more of the first time slices can be ignored.

Note that training need not be performed in real time. In one embodiment, the training signals are simply captured to a hard disk and when training is complete the signals are played back to the system for training.

Note also that while this description and the following claims refer to performance and classification/recognition of various finger gestures and/or finger movements, it should be understood that a finger gesture or "movement" can be performed (intended) and recognized even if a finger is missing and therefore not actually moved or pressured. Fingers (excepting perhaps the thumb, depending on how it is defined) do not actually have muscles, and "gestures", even with one or more fingers missing, refers to intentional muscle contraction. Therefore "gestures" can be recognized by corresponding muscle activation even if a finger is missing. Furthermore, a gesture can be intended, measured, labeled, and/or classified although actual finger movement need not occur. For example, a person can activate muscles in a way intended to move a finger in a particular way yet no actual finger movement may occur, either due to resisting pressure (e.g., a press gesture when the finger is already against a solid surface), counter pressure (e.g., a curl may be recognized though a countering lift force may prevent actual movement of the finger), or simply a low amount of muscular force being exerted.

Experimentation has shown that a rich variety of gestures are capable of being trained and classified. Various gesture vocabularies are possible. One or more types of intended movements (e.g., curl, extend, tap, press hard, press light, or lift) may be combined with one or more different individual fingers or groups of fingers. Some example gesture vocabularies or sets are:

1) tap any finger, curl any finger;
2) lift index finger or curl index finger;
3) extend or curl index finger or middle finger;
4) lift any finger except thumb, tap thumb; or
5) light press or hard press index finger, middle finger, or thumb.

If the model is trained for set 1, for example, then the samples/features would be classified as either a tap or a curl, regardless of finger. If the model is trained with set 2, for example, then samples/features would be classified as either a lift of the index finger or a curl of the index finger (if other fingers are moved, no gesture would be recognized). If sample 3 were trained, an intended extension or curl of either the index finger or a curl or extension of the middle finger would be recognized. If sample 5 were trained, light or hard presses of the listed fingers would be recognized, including which finger performed the gesture. In one embodiment, a particular gesture can be designated to expand, contract, or switch the current vocabulary to another vocabulary. For example, a thumb tap might the only gesture initially, and recognition of a thumb tap causes the model to start recognizing other gestures.

In labeling the training data, it is possible to use values immediately after the stimulus presentation, but response time to training stimulus can vary significantly. Therefore, labeling based on the presented stimuli is more accurate toward the end of the stimulus presentation period. Hence it may be helpful to ignore the first second or so of samples for a particular gesture trial and use only the next following samples. Rest samples can be sampled right before a training gesture is performed.

Further regarding accuracy, the classification accuracy can be improved by omitting certain gestures from the set of trained and recognized gestures. In particular, gestures hard to disambiguate can be omitted. For example, light taps may be problematic and using only firm taps as gestures would likely result in more accurate classification. Also, certain finger combinations might be hard to predict reliable. For example, pressing both a pinky and neighboring ring finger may be hard to distinguish from an individual press of either finger. Furthermore, it should be noted that a gesture set or "vocabulary" need not include all fingers. For example, a gesture set might be trained to recognize only several fingers, for example thumb, index finger, and middle finger.

Some noise can be introduced by error on the person 196 who is performing the training. The person 196 might perform the incorrect gesture, for example. This problem can be reduced by having a secondary mechanism to verify that the correct gesture was performed. For example, if finger tap gestures are being trained, the person 196 could perform the taps on a keyboard, and the keyboard could be used to cross check the training labels. Also, the more training is performed, the more accurate the classification results.

Testing has shown that the index and middle fingers can be most reliably identified. Even a simple set of two gestures—index finger press and middle finger press—can be useful for control of machinery, user interface controls, volume control, forward/backward navigation, and so on.

If a wearable device with sensors is expected to be used in an active manner where the wearer is moving around and using their hands and arms to perform different activities, it will improve recognition accuracy if gestures are trained from a variety of positions. As the hand, wrist, and arm moves, the skin, and therefore sensors, may move over different muscle groups or different points along the muscles. Some muscles may even effectively disappear. Therefore, a training session might also instruct the trainer to perform a gesture with different arm positions, for example with arm bent, extended, palm up, palm down, etc.

Conclusion

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and featured can be performed on any type of computing device 136, including portable devices, workstations, servers, mobile wireless devices, and so on. Some or all of the computer readable may be part of the computing device 136, or it may be separate from the computing device 136.

The invention claimed is:

1. A method for identifying individual finger movements, comprising:
   arbitrarily arranging a plurality of electromyography (EMG) sensors on a user's forearm;
   performing one or more predefined finger gestures while using the EMG sensors to sample EMG signals generated by corresponding muscle contractions of the user;
   concurrent with the sampling of the EMG signals, monitoring the predefined finger gestures using a secondary input mechanism to verify that correct gestures were performed;
   extracting feature samples from the sampled EMG signals and labeling the feature samples according to corresponding finger gestures that have been verified as correct by the secondary input mechanism; and
   training a machine learning model with the labeled feature samples for use in identifying arbitrary finger gestures from an evaluation of corresponding EMG signal samples.

2. The method of claim 1 wherein the predefined finger gestures comprise concurrent movement of two or more different fingers.

3. The method of claim 1 wherein the predefined finger gestures are finger taps.

4. The method of claim 3 wherein the secondary input mechanism is a keyboard that detects the finger taps concurrent with corresponding sampled EMG signals.

5. The method of claim 1 wherein the user is provided with instructions for performing one or more of the predefined finger gestures.

6. The method of claim 1 wherein one or more of the predefined finger gestures include intentional forearm muscle contractions corresponding to the predefined figure gestures performed by users missing at least a portion of corresponding fingers.

7. The method of claim 1 wherein one or more of the predefined finger gestures include attempted finger movement against a resistive force causing corresponding muscle contractions in the user's forearm.

8. The method of claim 1 wherein one or more of the arbitrary finger gestures include attempted finger movement against a resistive force causing corresponding muscle contractions in the user's forearm.

9. The method of claim 1 wherein one or more of the predefined finger gestures comprise a plurality of pressure levels applied by one or more fingers.

10. The method of claim 1 wherein the predefined finger gestures include using one or more particular fingers to perform one or more of tap gestures, curl gestures, extension gestures, press gestures, and lift gestures.

11. The method of claim 1 wherein using the trained machine learning model to evaluate EMG signal samples further comprises:
    evaluating a sequence of two or more successive EMG signal samples to identify arbitrary finger gestures corresponding to each sample;
    aggregating each sequential identified arbitrary finger gesture; and
    evaluating the aggregate identifications to identify a single arbitrary finger gesture corresponding to the sequence of two or more successive EMG signal samples.

12. One or more computer readable memories storing information to enable a computing device to perform a process comprising:
    using a plurality of electromyography (EMG) sensors arbitrarily arranged on a user's forearm to obtain samples of EMG signals generated by muscle contractions of a user while the user is performing one or more predefined finger gestures;
    monitoring the predefined finger gestures using a secondary input mechanism to verify that correct gestures were performed;
    extracting feature samples from the sampled EMG signals and labeling feature samples according to the corresponding finger gestures that have been verified as correct by the secondary input mechanism;
    training a machine learning model with the labeled feature samples; and
    using the trained machine learning model to evaluate EMG signal samples obtained during arbitrary finger gestures to identify those arbitrary finger gestures relative to one or more of the predefined finger gestures performed by the user.

13. The computer readable memories of claim 12 wherein the trained machine learning model:
    evaluates a sequence of two or more successive EMG signal samples to identify arbitrary finger gestures corresponding to each sample;
    aggregates each sequential identified arbitrary finger gesture; and
    evaluates the aggregate identifications to identify a single arbitrary finger gesture corresponding to the sequence of two or more successive EMG signal samples.

14. The computer readable memories of claim 12 wherein the predefined finger gestures comprise concurrent movement of two or more different fingers.

15. The computer readable memories of claim 12 wherein one or more of the predefined finger gestures include intentional forearm muscle contractions corresponding to the predefined figure gestures performed by users missing at least a portion of corresponding fingers.

16. The computer readable memories of claim 12 wherein one or more finger gestures include attempted finger movement against a resistive force causing corresponding muscle contractions in the user's forearm.

17. A device for determining user gestures based on electromyography (EMG) signals derived from EMG sensors, comprising:
    a plurality of EMG sensors arbitrarily arranged on a user's forearm;
    a processor for interacting with one or more modules;
    a signal analysis module configured to obtain samples from one or more of the EMG sensors of EMG signals generated by muscle contractions of a user while the user is performing one or more predefined finger gestures;
    wherein the signal analysis module further monitors the predefined finger gestures using a secondary input mechanism to verify that correct predefined finger gestures were performed;
    a feature extraction module configured to extract feature samples from the sampled EMG signals and label the feature samples according to corresponding finger gestures that have been verified as correct by the secondary input mechanism; and
    a training module configured to train a machine learning model using the labeled feature samples
    to identify arbitrary finger gestures relative to one or more of the predefined finger gestures performed by the user.

18. The device of claim 17 wherein one or more of the predefined finger gestures are performed while the user is maintaining one or more predefined arm positions including, one or more of arm bent, arm extended, palm up, and palm down.

19. The device of claim 17 wherein the predefined finger gestures comprise concurrent movement of two or more different fingers.

20. The device of claim 17 wherein one or more finger gestures include attempted finger movement against a resistive force causing corresponding muscle contractions in the user's forearm.

* * * * *